(12) United States Patent
Yamada et al.

(10) Patent No.: US 10,283,791 B2
(45) Date of Patent: May 7, 2019

(54) FUEL CELL SYSTEM

(71) Applicant: TOYOTA JIDOSHA KABUSHIKI KAISHA, Toyota-shi, Aichi-ken (JP)

(72) Inventors: Takashi Yamada, Hekinan (JP); Hiroyuki Imanishi, Toyota (JP); Mitsuhiro Nada, Toyota (JP)

(73) Assignee: Toyota Jidosha Kabushiki Kaisha, Toyota-shi, Aichi-ken (JP)

( * ) Notice: Subject to any disclaimer, the term of this patent is extended or adjusted under 35 U.S.C. 154(b) by 489 days.

(21) Appl. No.: 14/935,039

(22) Filed: Nov. 6, 2015

(65) Prior Publication Data
US 2016/0141680 A1 May 19, 2016

(30) Foreign Application Priority Data
Nov. 14, 2014 (JP) .................. 2014-231626

(51) Int. Cl.
*H01M 8/04* (2016.01)
*H01M 8/04701* (2016.01)
*B60H 1/14* (2006.01)
*H01M 8/04007* (2016.01)
*H01M 8/0432* (2016.01)
(Continued)

(52) U.S. Cl.
CPC .... *H01M 8/04723* (2013.01); *B60H 1/00271* (2013.01); *B60H 1/00278* (2013.01); *B60H 1/00735* (2013.01); *B60H 1/00885* (2013.01); *B60H 1/143* (2013.01); *H01M 8/04007* (2013.01); *H01M 8/04029* (2013.01); *H01M 8/04037* (2013.01); *H01M 8/04373* (2013.01); *H01M 8/04738* (2013.01); *H01M 8/04768* (2013.01); *B60H 2001/00307* (2013.01);
(Continued)

(58) Field of Classification Search
CPC ................. H01M 8/04723; B60H 1/00271
USPC ......................................... 429/437
See application file for complete search history.

(56) References Cited

U.S. PATENT DOCUMENTS

2011/0177416 A1 7/2011 Suematsu et al.
2012/0122000 A1* 5/2012 Lee .................. B60H 1/2218
429/429

FOREIGN PATENT DOCUMENTS

JP 2008-130470 6/2008
JP 2010-267471 11/2010
(Continued)

*Primary Examiner* — James M Erwin
(74) *Attorney, Agent, or Firm* — Finnegan, Henderson, Farabow, Garrett & Dunner LLP

(57) ABSTRACT

A fuel cell system includes a control unit configured to perform air-conditioning-system preparation control, wherein, under the air-conditioning-system preparation control, when an air conditioning system is not requested to heat air, it is determined whether or not a coolant within a coolant circulation passage is capable of being supplied to an air conditioning circuit, when the coolant within the coolant circulation passage is not capable of being supplied to the air conditioning circuit, the heater is operated to maintain a first predetermined temperature or higher of the coolant within the air conditioning circuit, and when the coolant within the coolant circulation passage is capable of being supplied to the air conditioning circuit, the air-conditioning water pump is operated to draw the coolant from the coolant circulation passage into the air conditioning circuit and to maintain the first predetermined temperature or higher of the coolant within the air conditioning circuit.

6 Claims, 7 Drawing Sheets

(51) Int. Cl.
*B60H 1/00* (2006.01)
*H01M 8/04029* (2016.01)
*H01M 8/04746* (2016.01)

(52) U.S. Cl.
CPC .. *H01M 2250/20* (2013.01); *H01M 2250/405* (2013.01); *Y02B 90/16* (2013.01); *Y02T 90/32* (2013.01)

(56) References Cited

FOREIGN PATENT DOCUMENTS

| | | |
|---|---|---|
| JP | 2013-168281 | 8/2013 |
| JP | 2013-177101 | 9/2013 |

\* cited by examiner

FUEL CELL SYSTEM

CROSS-REFERENCE TO RELATED APPLICATION

This application is based upon and claims the benefit of priority of the prior Japanese Patent Application No. 2014-231626, filed on Nov. 14, 2014, the entire contents of which are incorporated herein by reference.

FIELD OF THE INVENTION

The present invention relates to a fuel cell system.

BACKGROUND

Conventionally, it is proposed to operate a heater at the time of requesting to heat air having been supplied to a passenger compartment in which a fuel cell is installed after the completion of the warming-up of the fuel cell (for example, see Japanese Unexamined Patent Application Publication No. 2010-267471). In addition to this, there are various proposals of a combination of a coolant circulation passage of the fuel cell and an air-conditioning circuit that shares the coolant (for example, see Japanese Unexamined Patent Application Publication Nos. 2013-168281, 2013-177101, and 2008-130470).

However, in Japanese Unexamined Patent Application Publication No. 2010-267471, even when the fuel cell system is placed, for example, in a low temperature environment, the heater is operated after heating is requested. Therefore, it might take time to warm the coolant flowing in the air conditioning circuit, which might cause low responsiveness to a user's request. Furthermore, the power consumption might be increased by using the heater. These disadvantages might also occur even in the proposals of Japanese Unexamined Patent Application Publication Nos. 2013-468281, 2013-177101, and 2008-130470.

SUMMARY OF THE INVENTION

It is therefore an object of the fuel cell system disclosed herein to improve responsiveness of an air conditioning system including an air conditioning circuit connected to a coolant circulation passage for cooling a fuel cell stack.

According to an aspect of the present invention, a fuel cell system disclosed herein includes: a fuel cell stack; a coolant circulation passage through which a coolant for cooling the fuel cell stack circulates; an air conditioning system including an air conditioning circuit that is connected to the coolant circulation passage and shares the coolant circulating through the coolant circulation passage; an air-conditioning water pump causing the coolant to flow through the air conditioning circuit; a heater arranged on the air conditioning circuit; and a control unit configured to perform air-conditioning-system preparation control, wherein, under the air-conditioning-system preparation control, when the air conditioning system is not requested to heat air, it is determined whether or not the coolant within the coolant circulation passage is capable of being supplied to the air conditioning circuit, when the coolant within the coolant circulation passage is not capable of being supplied to the air conditioning circuit, the heater is operated to maintain a temperature of the coolant within the air conditioning circuit at a first predetermined temperature or higher, and when the coolant within the coolant circulation passage is capable of being supplied to the air conditioning circuit, the air-conditioning water pump is operated to draw the coolant from the coolant circulation passage into the air conditioning circuit and to maintain the temperature of the coolant within the air conditioning circuit at the first predetermined temperature or higher.

When an outside air temperature is equal to or lower than a predetermined temperature, the control unit may perform the air-conditioning-system preparation control.

When the coolant within the coolant circulation passage is not capable of being supplied to the air conditioning circuit, and when a temperature of the coolant within the air conditioning circuit reaches a second predetermined temperature set higher than the first predetermined temperature, the control unit may stop operating the heater.

When the coolant within the coolant circulation passage is not capable of being supplied to the air conditioning circuit, the control unit may operate the heater so as to output an output lower than an output at a time when the air conditioning system is requested to heat air When the coolant within the coolant circulation passage is capable of being supplied to the air conditioning circuit, the control. unit may maintain the temperature of the coolant within the air conditioning circuit in a range from a third predetermined temperature set higher than the first predetermined temperature to a temperature of the coolant circulating through the coolant circulation passage.

When the coolant within the coolant circulation passage is capable of being supplied to the air conditioning circuit, the control unit may intermittently operate the air-conditioning water pump, and an operating period for each operation may be set equal to or longer than a period during which the coolant within the air conditioning circuit is capable of being replaced with the coolant drawn from the coolant circulation passage.

DETAILED DESCRIPTION

Figure 1:
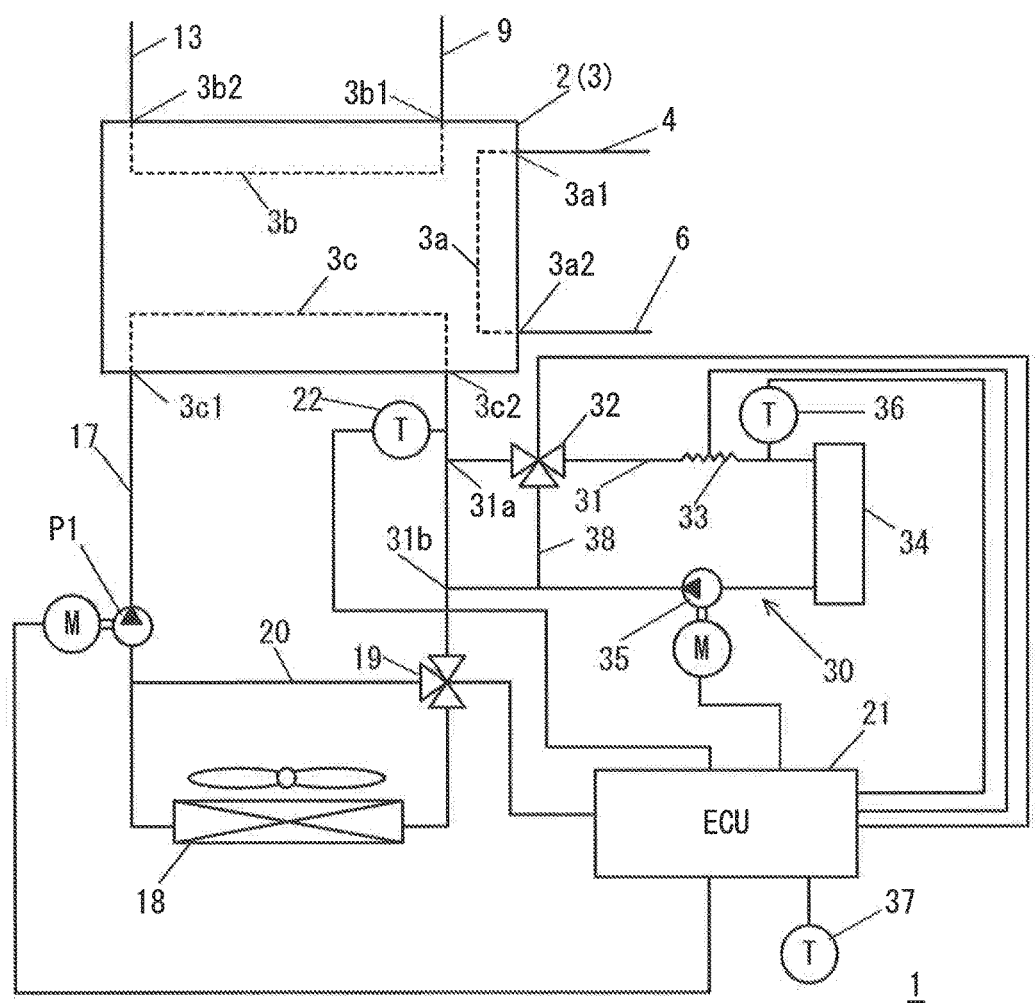
FIG. 1 is an explanatory view illustrating schematic structure of a part of a fuel cell system according to the first embodiment.

An embodiment according to the present invention will be described with reference to the accompanying drawings.

However, a dimension and a ratio of each component illustrated in the drawings may not correspond to the reality.

First Embodiment

First, a description will be given of a fuel cell system 1 according to a first embodiment with reference to FIG. 1. FIG. 1 is an explanatory view illustrating schematic structure of a part of the fuel cell system 1 according to a first embodiment. Incidentally, FIG. 1 illustrates the part of the fuel cell system 1, specifically, around the fuel cell stack 3, a coolant circulation passage 17, and an air conditioning system 30. For this reason, elements to be described later will not be illustrated in FIG. 1. The fuel cell system 1 can be installed in various movable objects such as vehicles, ships, airplanes, and robots, and also can be installed in stationary powers. Here, the fuel cell system 1 installed in an automobile will be described as an example. The fuel cell system 1 includes a solid polymer fuel cell 2. The fuel cell 2 includes a fuel cell stack 3 formed by stacking single cells each having a cathode electrode, an anode electrode, and an electrolyte membrane disposed therebetween. A cathode channel 3a and an anode channel 3b are formed inside the fuel cell stack 3. The electrolyte membrane is, for example, a proton conducting solid polymer electrolyte membrane. Additionally, illustration of the single cell is omitted in FIG. 1. Moreover, the fuel cell stack 3 is provided within a coolant channel 3c through which coolant to cool the fuel cell stack 3 flows. In the fuel cell stack 3, the anode electrode is supplied with a hydrogen gas, namely, an anode gas. The cathode electrode is supplied with air containing oxygen, namely, a cathode gas. Hydrogen ions, generated by catalytic reaction in the anode electrode, move to the cathode electrode through the electrolyte membrane to electrochemically react to oxygen, which generates electricity. The fuel cell stack 3 is connected to a voltage meter for measuring a voltage value and a current meter for measuring a current value of the generated electricity. The coolant flowing through the coolant channel 3c cools the fuel cell stack 3.

An inlet of the fuel cell stack 3, specifically, an inlet 3a1 side of the cathode channel 3a of the fuel cell stack 3 is connected to a cathode gas supply passage 4. An air cleaner is mounted at an end of the cathode gas supply passage 4. Further, on the cathode gas supply passage 4, a compressor is arranged for pumping and supplying the cathode gas to the fuel cell stack 3. On the cathode gas supply passage 4, the pressure regulating valve is arranged for regulating the pressure between an outlet of the compressor and the inlet 3a1 of the fuel cell stack 3.

An outlet 3a2 side of the cathode channel 3a of the fuel cell stack 3 is connected to a cathode off-gas discharge passage 6. On the cathode off-gas discharge passage 6, a backpressure valve is arranged. The backpressure valve regulates the pressure of an area, in the downstream side of the compressor on the cathode gas supply passage 4, in the cathode channel 3a, and in the upstream side of the backpressure valve on and the cathode off-gas discharge passage 6, that is, the backpressure valve regulates the cathode backpressure. On the cathode off-gas discharge passage 6, a muffler is arranged on the downstream side of the backpressure valve.

An inlet 3b1 side of the anode channel 3b of the fuel cell stack 3 is connected to an anode supply passage 9. A hydrogen tank serving as a hydrogen supply source is connected to the end of the anode supply passage 9. In the hydrogen tank, high-pressure hydrogen is stored. On the anode supply passage 9, a shutoff valve is arranged for shutting off the supply of hydrogen, and a regulator is arranged for reducing the pressure of the hydrogen. An exhaust pipe 13 is connected to an outlet 3b2 side of the anode channel 3b of the fuel cell stack 3. On the end of the exhaust pipe 13, a gas-liquid separator is arranged. At the gas-liquid separator, the circulation passage and a purge passage are branched off. In the gas-liquid separator, water contained in the anode off-gas is separated. The anode off-gas separated from the water is discharged into the circulation passage. In contrast, the separated water is discharged into the purge passage. On the circulation passage, a pump is arranged. The arrangement of the pump on the circulation passage can supply the anode off-gas to the anode channel 3b again. The purge passage branched at the gas-liquid separator is connected to the downstream side of the backpressure valve provided on the cathode off-gas discharge passage 6. On the purge passage, a purge valve is arranged. By opening the purge valve, the anode off-gas not to be circulated can be discharged together with the cathode off-gas.

An inlet 3c1 of the coolant channel 3c of the fuel cell stack 3 is connected to an end of the coolant circulation passage 17. Further, the other end of the coolant circulation passage 17 is connected to an outlet 302 of the coolant channel 3c. On the coolant circulation passage 17, a pump P1 is arranged for circulating the coolant and supplying the coolant to the fuel cell stack 3. Further, on the coolant circulation passage 17, a radiator 18 is arranged. On the coolant circulation passage 17, a first three-way valve 19 is provided. A bypass passage 20 bypassing the radiator 18 is branched from the first three-way valve 19. The first three-way valve 19 is electric and is electrically connected to an ECU (Electronic Control Unit) 21 functioning as a control unit. Additionally, the first three-way valve 19 may be a so-called thermostat valve provided with a temperature sensing portion and changing the opening and closing state depending on the temperature of the coolant. The first three-way valve 19 causes the coolant to circulate through the radiator and cools the coolant, when the temperature of the coolant is higher than a predetermined value. In the vicinity of the outlet 3c2 of the coolant channel 3c, a first temperature sensor 22 is arranged. The first temperature sensor 22 and the pump P1 are also electrically connected to the ECU 21.

The fuel cell system 1 includes the air conditioning system 30. The air conditioning system 30 is an air conditioning equipment for a passenger compartment of a motor vehicle in which the fuel cell 2 is installed. The air conditioning system 30 is capable of blowing heated air into the passenger compartment in accordance with the operation of a passenger. The air conditioning system 30 is connected to the coolant circulation passage 17 and includes an air conditioning circuit 31 sharing the coolant circulating through the coolant circulation passage 17. Specifically, an inlet end 31a of the air conditioning circuit 31 is connected to the coolant circulation passage 17 at the downstream side of the first temperature sensor 22, and an outlet end 31b is connected to the coolant circulation passage 17 at the downstream side of the connection point of the inlet end 31a. On the air conditioning circuit 31, a second three-way valve 32, a heater 33, a heater core 34, and an air-conditioning water pump (hereinafter referred to as "air-conditioning W/P") 35 are arranged in this order from the inlet end 31a side. The heater 33 warms the coolant flowing through the air conditioning circuit 31. The heater core 34 performs heat exchange between air and the coolant flowing through the air conditioning circuit 31, and heated air is blown into the passenger compartment in accordance with vehicle passenger's operation. The air-conditioning W/P 35 causes the coolant to circulate through the air conditioning circuit 31. A second temperature sensor 36 is arranged between the heater 33 and the heater core 34 of the air conditioning circuit 31. The second three-way valve 32, the heater 33, the air-conditioning W/P 35, and the second temperature sensor 36 are electrically connected to the ECU 21. A bypass passage 38 is branched off from the second three-way valve 32. The other end of the bypass passage 38 is connected to a position near the outlet end 31b of the air conditioning circuit 31. The bypass passage 38 bypasses the heater 33, the heater core 34, the air-conditioning W/P 35, and the second temperature sensor 36.

The fuel cell system 1 includes the ECU (Electronic Control Unit) 21. The ECU 21 is a microcomputer including a CPU, a ROM, and a RAM, and functions as a control unit. The ECU 21 is electrically connected to an outside air temperature sensor 37 for measuring an outside air temperature, and in addition to the first temperature sensor 22, the second temperature sensor 36, and the like as described above. The ECU 21 stores a current-voltage map and the like. Such an ECU 21 performs the output setting process of the fuel cell system 1. In other words, a current value to be output is set on the basis of an air supply amount, a cathode backpressure, a hydrogen supply amount, a hydrogen pressure, an output history, a voltage, a current value map, and the like. The ECU 21 performs air-conditioning-system preparation control based on measured values of the first temperature sensor 22, the second temperature sensor 36, and the outside air temperature sensor 37.

Figure 2:
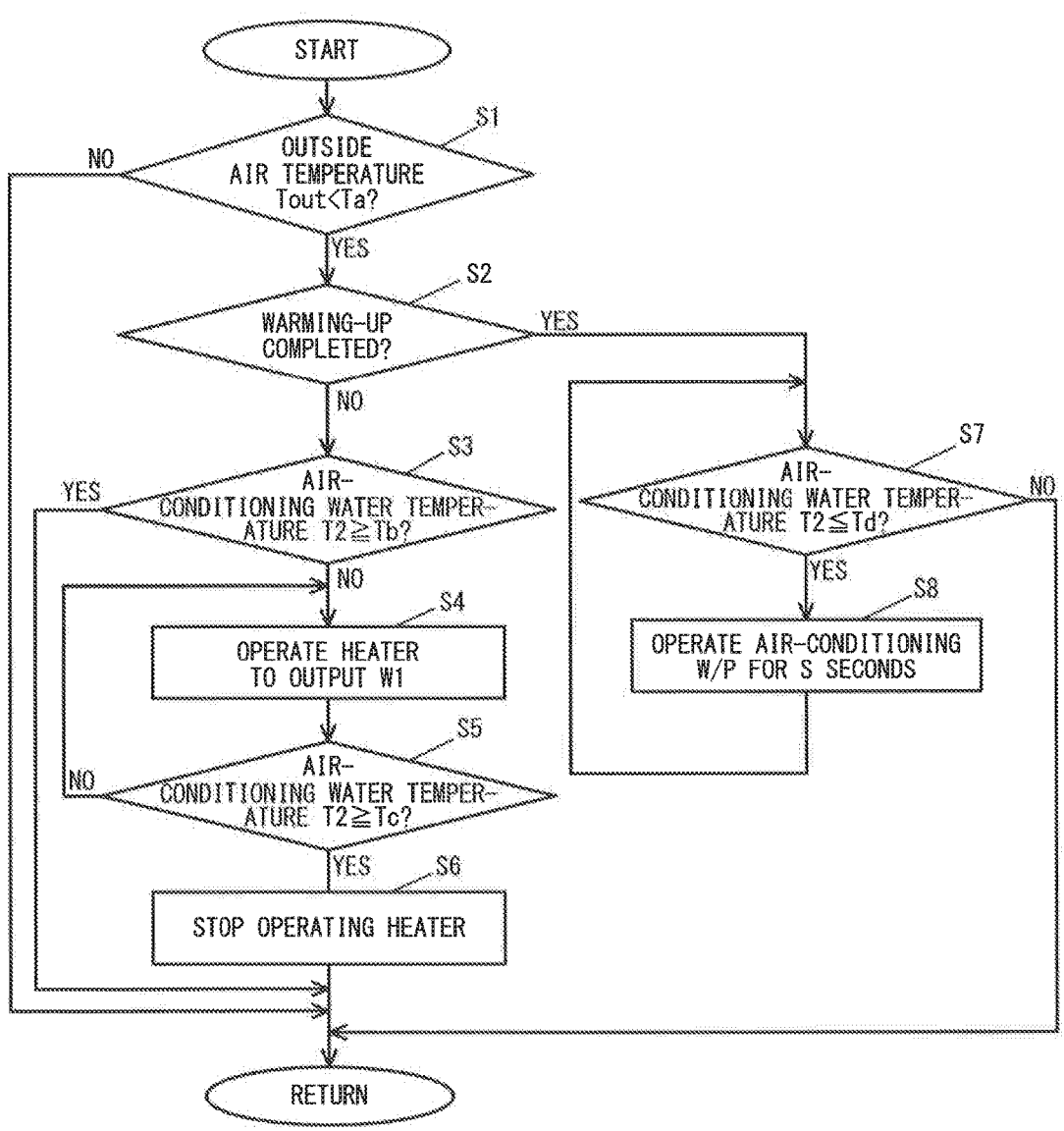
FIG. 2 is a flowchart illustrating an example of control of the fuel cell system in the first embodiment.

Next, a description will be given of the control of the fuel cell system 1 according to the first embodiment with reference to FIG. 2. FIG. 2 is a flowchart illustrating an example of the control of the fuel cell system 1 in the first embodiment. The ECU 21 proactively perform the control of the fuel cell system 1. Here, the basic idea of the air-conditioning-system preparation control will be described before describing the control in detail. For example, in a case where the passenger starts the fuel cell system 1 and uses the air conditioning system 30 to supply heated air into the passenger compartment after a while, if heated air does not start being blown immediately, the passenger might be dissatisfied with the delay of the blowing of heated air. After the fuel cell system 1 is started, the temperature of the coolant does not rise after a while in some cases. Thus, in a case of sharing the coolant circulating through the air conditioning circuit 31 and through the coolant circulation passage 17, there is a possibility to delay the blowing of heated air. Therefore, in the fuel cell system 1 in the present embodiment, when the coolant within the coolant circulation passage 17 is not capable of being supplied to the air conditioning circuit 31, the heater 33 heats the coolant, and air heated by the warmed coolant is prepared to be blown from the heater core 34. Further, when the coolant within the coolant circulation passage 17 is capable of being supplied to the air conditioning circuit 31, the warm coolant is drawn from the coolant circulation passage 17 into the air conditioning circuit 31, and air heated by the warm coolant is prepared to be blown from the heater core 34. The ECU 21 makes these preparations, when the air conditioning system 30 is not requested to heat air. The ECU 21 makes these preparations, for example, before the air conditioning system 30 is requested to heat air. Therefore, when a passenger requests heated air to be blown, it is possible to blow heated air immediately. Here, on the basis of various determination methods, it can be determined whether or not the coolant within the coolant circulation passage 17 is capable of being supplied to the air conditioning circuit 31. For example, it can be determined based on whether or not the warming-up of the fuel cell stack 3 is completed, more specifically, based on whether or not the temperature of the coolant flowing in the coolant circulation passage 17 is not less than a warming-up-completion determination threshold value. Also, it may be determined based on a communication state of a valve arranged at the connection portion of the coolant circulation passage 17 and the air conditioning circuit 31, namely, the communication state of the second three-way valve 32 in this embodiment. Specifically, on the basis of information on whether or not the communication state where the second three-way valve 32 communicates the coolant circulation passage 17 to the air conditioning circuit 31, the ECU 21 may determine whether or not the coolant within the coolant circulation passage 17 is capable of being supplied to the air conditioning circuit 31. In this case, on the basis of the communication state of the second three-way valve 32, the ECU 21 determines whether or not the coolant within the coolant circulation passage 17 is capable of being supplied to the air conditioning circuit 31. That is, the above determination is based on the communication state of the second three-way valve 32 without being based on the temperature of the coolant, although the communication of the second three-way valve 32 is controlled based on the temperature of the coolant within the coolant circulation passage 17. Here, the second three-way valve 32 is controlled independently of the air-conditioning W/P 35 arranged on the air conditioning circuit 31. Therefore, in the state where the second three-way valve 32 communicates between the coolant circulation passage 17 and the air conditioning circuit 31, it is determined that the coolant within the coolant circulation passage 17 is capable of being supplied to the air conditioning circuit 31, and the air-conditioning W/P 35 is operated. Further, on the basis of whether or not so-called quick warming-up is performing, the fuel cell system 1 may determine whether or not the coolant within the coolant circulation passage 17 is capable of being supplied to the air conditioning circuit 31. While the so-called quick warming-up performs, it is assumed that the heat generation amount increases and that the temperature of the coolant within the coolant circulation passage 17 increases immediately. Therefore, such a quick warming-up state can be included in the state where the coolant within the coolant circulation passage 17 is capable of being supplied to the air conditioning circuit 31. The following will mainly describe the contents of such air-conditioning-system preparation control of the fuel cell system 1.

The control of the fuel cell system 1 illustrated in the flowchart of FIG. 2 starts, when the fuel cell system 1 starts. This timing is identical to the time t1 in FIG. 4. First, in step S1, it is determined whether or not the outside air temperature Tout detected by the outside air temperature sensor 37 is less than a predetermined given temperature Ta. Here, the predetermined temperature Ta is a temperature at which it is expected that the passenger, in a motor vehicle quipped with the fuel cell system 1, uses and requests the air conditioning system 30 to blow heated air. When NO is determined in step S1, the processing returns. When YES is determined in step S1, the processing proceeds to step S2.

Figure 4:
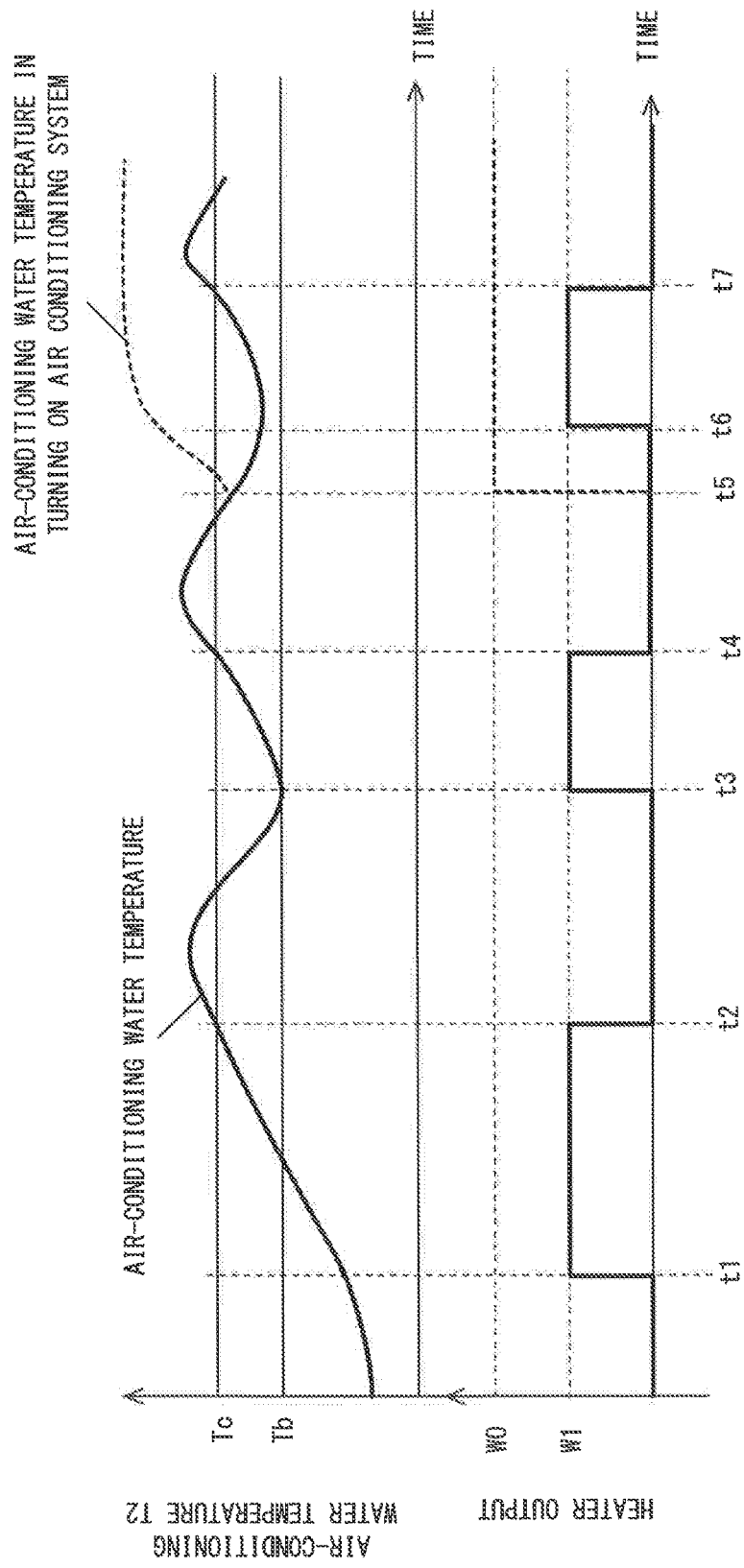
FIG. 4 is an example of a time chart indicating temperature change of coolant and operation conditions of a heater before the completion of the warming-up of the fuel cell system according to the first embodiment.

In step S2, it is determined whether or not the warming-up of the fuel cell stack 3 is completed. Specifically, the warming-up completion is determined based on the temperature, of the coolant within the coolant circulation passage 17, correlated with the temperature of the fuel cell stack 3. That is, it is determined whether or not the temperature T1 of the coolant detected by the first temperature sensor 22 is not less than a warming-up completion determination threshold Tw preset. Additionally, the warming-up completion determination in step S2 corresponds to an example of the determination whether or not the coolant within the coolant circulation passage 17 is capable of being supplied to the air conditioning circuit 31. In step S2, when No is determined, that is, when it is determined that the warming-up is not completed, the processing proceeds to step S3. The processing in step S3 to step S6 is the contents of the air-conditioning-system preparation control before the completion of the warming-up of the fuel cell stack 3. Additionally, FIG. 4 is an example of a time chart of the temperature change of the coolant and operation conditions of the heater 33 before the completion of the warming-up of the fuel cell system 1.

Figure 3:
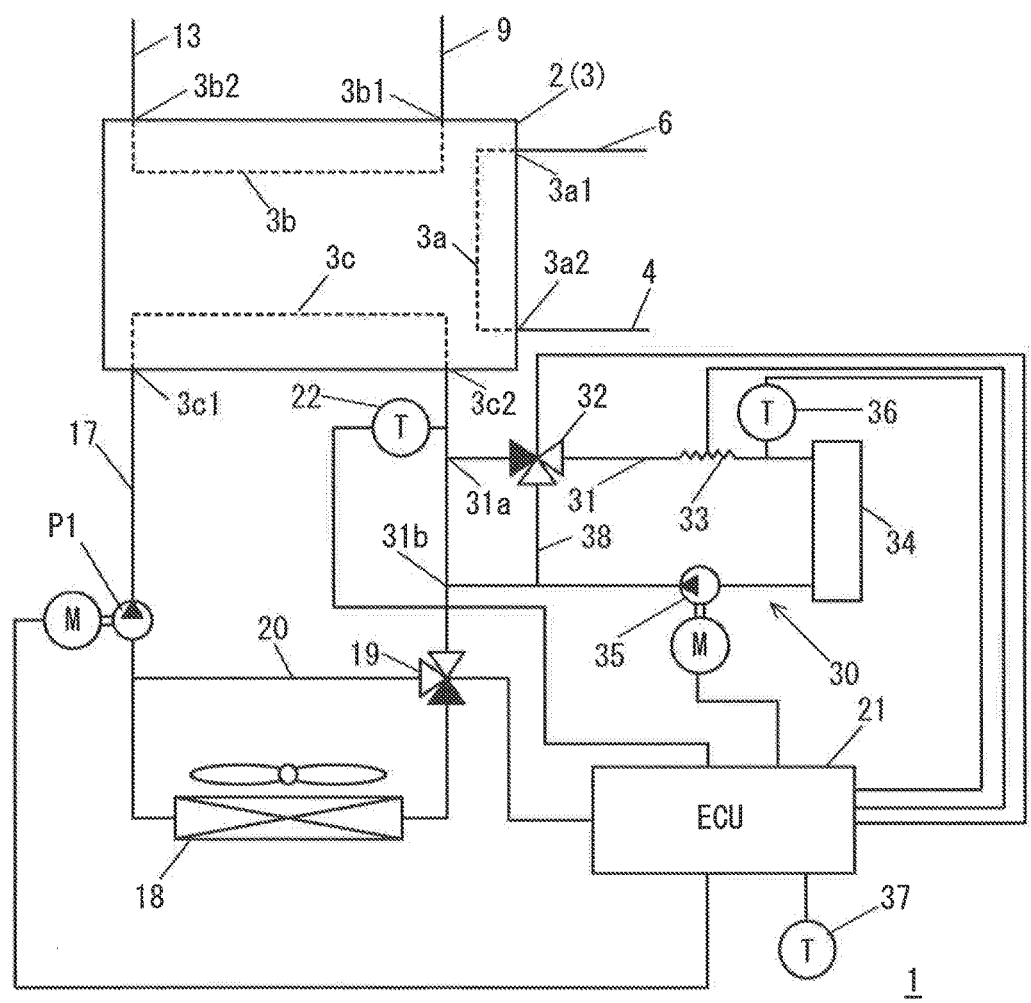
FIG. 3 is an explanatory view illustrating states of a first three-way valve and a second three-way valve before the completion of the warming-up of the fuel cell system according to the first embodiment.

Before the completion of the warming-up of the fuel cell stack 3, even when the coolant circulating through the coolant circulation passage 17 is drawn into the air conditioning circuit 31, it is difficult to bring the air conditioning system 30 into the state capable of supplying heated air. Therefore, before the completion of the warming-up of the fuel cell stack 3, the heater 33 increases the temperature of the coolant supplied to the heater core 34. Thus, before the completion of the warming-up of the fuel cell stack 3, the heater 33 is operated to warm the coolant in the air conditioning circuit 31. In the fuel cell system 1 before the completion of warming-up, the second three-way valve 32 is brought into a state where the coolant does not flow from the coolant circulation passage 17 as illustrated in FIG. 3. This suppresses the flow of the coolant in the air conditioning circuit 31, which effectively warms the coolant remaining in the air conditioning circuit 31.

In step S3, it is determined whether or not the temperature T2, detected by the second temperature sensor 36, of the coolant in the air conditioning circuit 31 (hereinafter referred to as "air-conditioning water temperature") is not less than a first predetermined temperature Tb. Here, the first predetermined temperature Tb is preset as a lower limit temperature at which the air conditioning system 30 is capable of supplying heated air, and it referred to as the lower limit temperature Tb in the following description. Therefore, only when the air-conditioning water temperature T2 is maintained to be equal to or higher than the lower limit temperature Tb, it is possible to supply heated air from the heater core 34 immediately. When YES is determined in step S3, that is, when the air-conditioning water temperature T2 is maintained to equal to or higher than the lower limit temperature Tb, the processing returns. In contrast, when NO is determined in step S3, the processing proceeds to step S4. In step S4, the heater 33 is operated. At this time, the heater output is set to W1 so as to rise, for example, at timings of times t1, t3 and t6 illustrated in FIG. 4. Here, the heater output W1 is lower than an output when the air conditioning system 30 is requested to heat air. In FIG. 4, a dotted line rising at the time t5 represents the heater output W0, when the passenger requests the air conditioning system 30 to heat air. In this way, in step S4, the heater 33 is operated so as to output the heater output W1 lower than the heater output W0. Thus, it is possible to suppress the power consumption in the air-conditioning-system preparation control. In addition, the energy recovered from regenerative braking may be used as the power to operate the heater 33.

In step S5 subsequently to step S4, it is determined whether or not the air-conditioning water temperature T2 is not less than an upper limit temperature Tc. Here, the upper limit temperature Tc is a second predetermined value set and is higher than the lower limit temperature Tb for the purpose of suppressing hunting. When NO is determined in step S5, and the processing in step S4 repeats to continue operating the heater 33. When YES is determined in step S5, the processing proceeds to step S6 to stop operating the heater 33. In this way, previously setting the upper limit temperature Tc can suppress the occurrence of hunting. In FIG. 4, the air-conditioning water temperature T2 reaches a hunting-suppression temperature Tc at timings of times t2, t4, and t7. At these timings, the operation of the heater 33 is stopped. Even after the operation of the heater 33 is stopped, the air-conditioning water temperature T2 increases with a slight time lag and slightly exceeds the hunting-suppression temperature Tc, and then the air-conditioning water temperature T2 decreases gradually. When the air-conditioning water temperature T2 reaches the lower limit temperature Tb again, the heater 33 is operated again. Thus, the temperature of the coolant within the air conditioning circuit 31 is maintained substantially in a range from the lower limit temperature Tb to the hunting-suppressing temperature Tc. Thus, as long as the air conditioning system 30 is prepared in such a way, for example, even when the air conditioning system 30 is requested to heat air at the time t5 in FIG. 4, the air conditioning system 30 can supply heated air immediately. Also, when heating is requested, the air-conditioning water temperature T2 starts rising from a temperature higher than the lower limit temperature Tb. This can shorten the period to reach the air-conditioning water temperature T2 at the time when the air conditioning system 30 is actually operated, as indicated by the dotted line in FIG. 4. After step S6, the processing returns.

Figure 6:
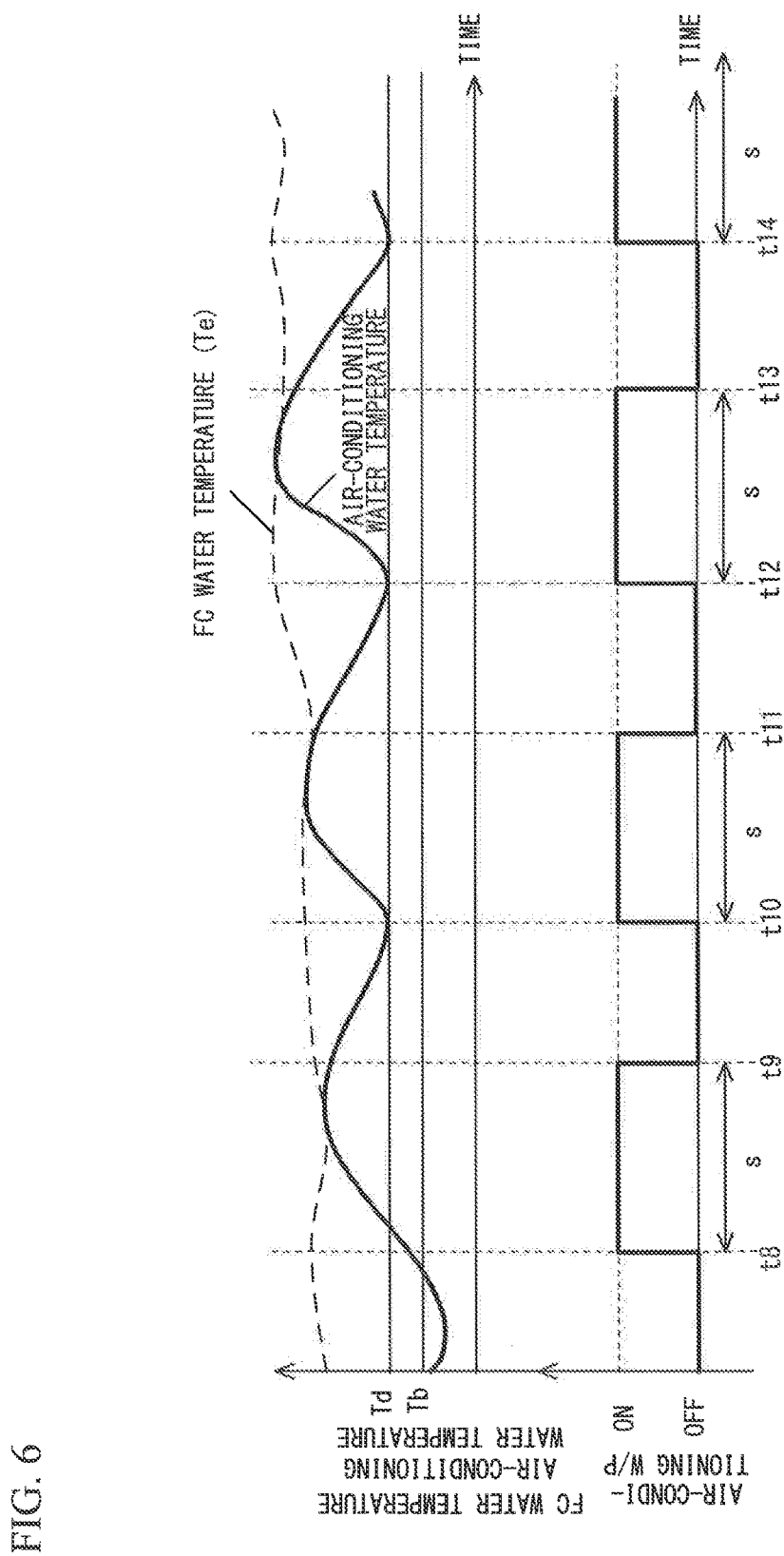
FIG. 6 is an example of a time chart indicating temperature change of the coolant and operation conditions of an air-conditioning water pump after the completion of the warming-up of the fuel cell system according to the first embodiment.

In step S2, when YES is determined, that is, when it is determined that warming-up is completed, the processing proceeds to step S7. The processing in step S7 and step S8 is the air-conditioning-system preparation control after the completion of the warming-up of the fuel cell stack 3. Additionally, FIG. 6 is an example of a time chart indicating the temperature change of the coolant and operation conditions of the air-conditioning W/P 35 after the completion of the warming-up of the fuel cell system 1.

Figure 5:
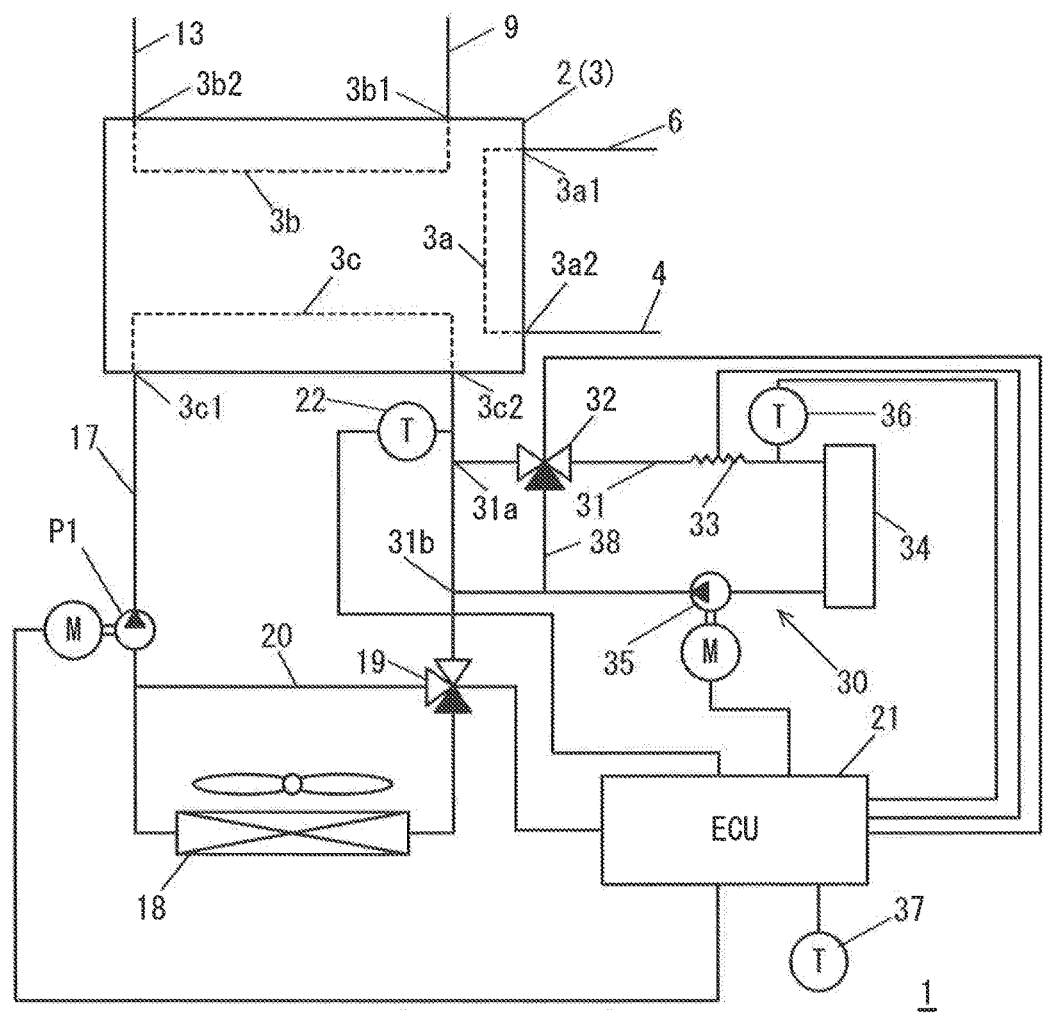
FIG. 5 is an explanatory view illustrating the states of a first three-way valve and a second three-way valve after the completion of the warming-up of the fuel cell system according to the first embodiment.

After the completion of the warming-up of the fuel cell stack 3, the temperature Te of the coolant circulating through the coolant circulation passage 17 (hereinafter referred to as "FC water temperature") becomes high. This coolant is drawn into the air-conditioning circuit 31, thereby bringing the air conditioning system 30 into the state capable of supplying heated air. Therefore, after the completion of the warming-up of the fuel cell stack 3, the air-conditioning W/P 35 is operated to maintain the temperature of the coolant within the air conditioning circuit 31 over the lower limit temperature Tb at which the air conditioning system 30 can supply heated air. In the fuel cell system 1 after the completion of the warming-up, the second three-way valve 32 is brought into the state where the coolant flows thereinto from the coolant circulation passage 17 as illustrated in FIG. 5. Accordingly, it is possible to draw warm coolant from the coolant circulation passage 17 into the air conditioning circuit 31.

In step S7, it is determined whether or not the air-conditioning water temperature T2 is not more than a temperature Td. Here, the temperature Td is set as a third predetermined temperature higher than the lower limit temperature Tb. The temperature Td is set as the lower limit temperature, instead of the lower limit temperature Tb. In more detail, the temperature Td is higher than the lower limit temperature Tb, and is lower than a temperature that is assumed as the FC temperature after the warming-up of the fuel cell system 1 is completed. In the state where the warming-up of the fuel cell system 1 is completed, the temperature of the coolant circulation passage 17 is high. Thus, to effectively use this heat quantity, the temperature of the coolant within the air conditioning circuit 31 is maintained as high as possible. Since the temperature Td is higher than the lower limit temperature Tb, it is possible to prepare the air conditioning system 30 to supply heated air by maintaining the temperature Td.

When NO is determined in step S7, that is, when the air-conditioning water temperature T2 is higher than the temperature Td, the process returns. In contrast, when YES is determined in step S7, the processing proceeds to step S8. In step S8, the air-conditioning W/P 35 is operated. The timings of operating the air-conditioning W/P 35 are, for example, the times t8, t10, t12, and t14 in FIG. 6 at which the air-conditioning water temperature T2 are the temperature Td or less. In this way, the air-conditioning W/P 35 is intermittently operated at the timing when the air-conditioning water temperature T2 is the temperature Td or less. Here, S seconds of the operating period of the air-conditioning W/P 35 for each operation are set equal to or longer than a period during which the coolant within the air conditioning circuit 31 can be replaced with the coolant drawn from the coolant circulation passage 17 into the air conditioning circuit 31. Thus, in FIG. 6, the times t9, t11, and t13 are times when S seconds elapse from the times t8, t10, and t12, respectively. S seconds is set as the operating period. This is because, only when the temperature of the coolant within the air conditioning circuit 31 increases to temporarily reach a desired temperature, the air conditioning system 30 is prepared sufficiently before heating is requested. In this way, the air-conditioning W/P 35 is intermittently operated and S seconds are set as the operating period for each operation, and it is thus possible to reduce power consumption. Additionally, after the processing in step S8, the processing in step S7 repeats again, which achieves the intermittent operation of the air-conditioning W/P 35. Incidentally, instead of controlling the timing of finishing the air-conditioning W/P 35 for each operation in accordance with S seconds of the operating period, each operation of the air-conditioning W/P 35 may be finished at the timing when the air-conditioning water temperature T2 is identical to the FC temperature Te.

As described above, according to the fuel cell system 1 in the present embodiment, the air-conditioning-system preparation control is performed when the air conditioning system 30 is not requested to heat air, and it is thus possible to improve the responsiveness of the air conditioning system 30.

Second Embodiment

Next, the second embodiment will be described with reference to FIG. 7. The second embodiment differs from the first embodiment in the contents of the air-conditioning-system preparation control. Therefore, the hardware configuration of the fuel cell system 1 is common to the first and second embodiments. In the following, referring to a flowchart in FIG. 7, a description will be given of an example of the control of the fuel cell system 1 in the second embodiment, specifically, differences from the first embodiment.

Figure 7:
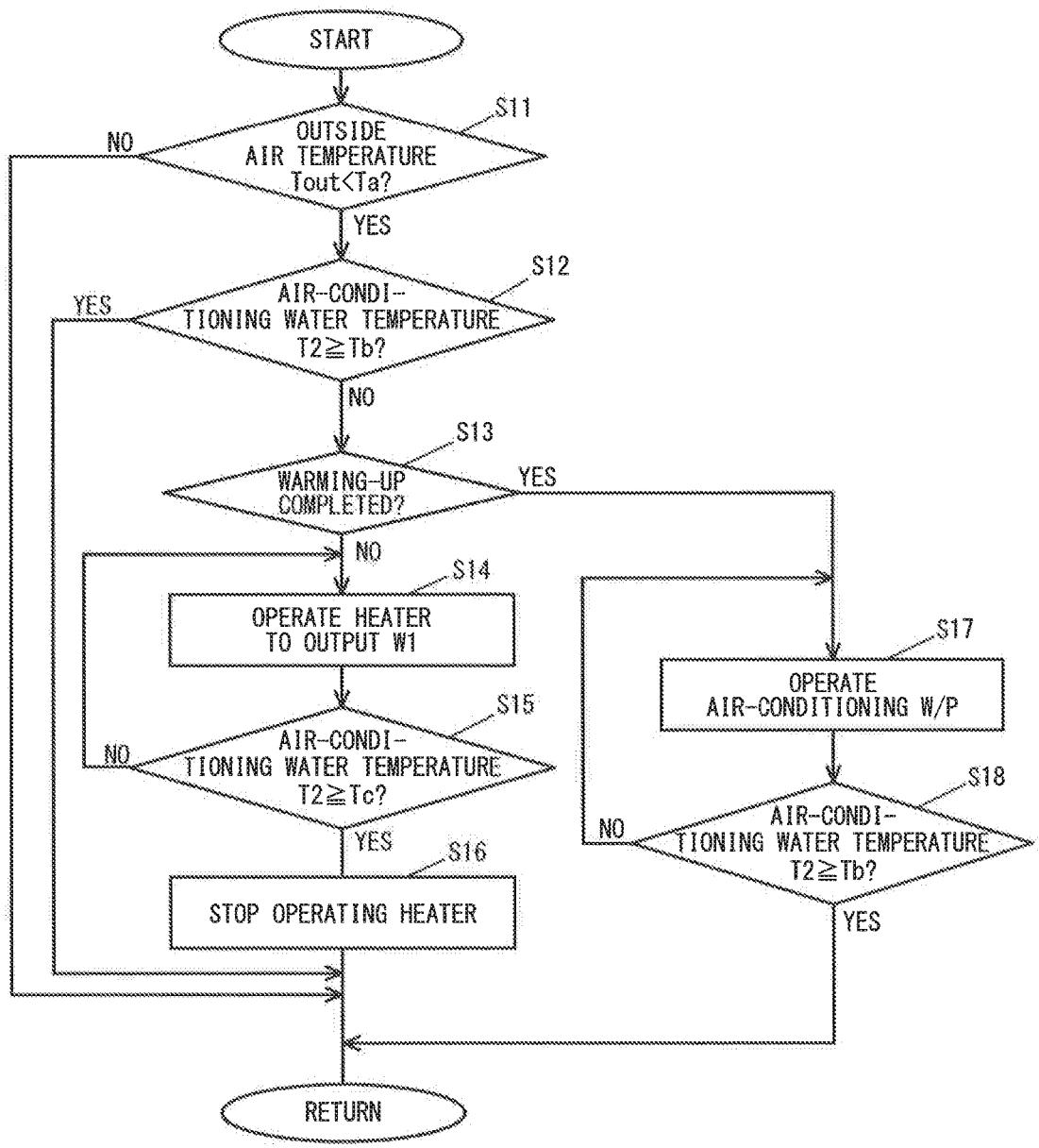
FIG. 7 is a flowchart illustrating an example of control of a fuel cell system according to the second embodiment.

The control of the fuel cell system 1 illustrated in the flowchart of FIG. 7 starts at the timing of starting the fuel cell system 1, and this timing is identical to the time t8 in FIG. 6. First, in step S11, it is determined whether or not the outside air temperature Tout is lower than a predetermined temperature Ta preset. The processing in step S11 is common with step S1 in the first embodiment. When NO is determined in step S11, the processing returns.

When YES is determined in step S11, the processing proceeds to step S12. In step S12, it is determined whether or not the air-conditioning water temperature T2 is not less than the lower limit temperature Tb. When YES is determined in step S12, that is, when the air-conditioning water temperature T2 is equal to or higher than the lower limit temperature Tb, it is determined that the preparation of the air conditioning system 30 is completed, and the processing returns. In contrast, when NO is determined in step S12, the processing proceeds to step S13.

In step S13, it is determined whether or not the warming-up of the fuel cell stack 3 is completed. Processing of step S13 is common with step S2 in the first embodiment. When NO is determined in step S13, that is, when the warming-up is not completed, the processing proceeds to step S14. Processing in step S14 to step S16 correspond to the processing in step S4 to step S6 in the first embodiment. Additionally, like the first embodiment, when the processing in step S14 to step S16 is performed, the second three-way valve 32 is brought into the state illustrated in FIG. 3.

When YES is determined in step S13, the processing proceeds to step S17. In step S17, the air-conditioning W/P 35 is operated. Subsequently, in step S18, it is determined whether or not the air-conditioning water temperature 12 is not less than the lower limit temperature Tb. When YES is determined in step S18, that is, when the air-conditioning water temperature T2 is equal to or higher than the lower limit temperature Tb, the process returns. In contrast, when NO is determined in step S18, that is, when air-conditioning water temperature T2 is less than the lower limit temperature Tb, the processing in step S17 repeats to continue operating of the air-conditioning W/P 35. In addition, like step S7 and step S8 in the first embodiment, when the processing in step S17 and step S18 is performed, the second three-way valve 32 is brought into the state illustrated in FIG. 5.

Even in such control, the air-conditioning-system preparation control is performed when the air conditioning system 30 is not requested to heat air, and it is thus possible to improve the responsiveness of the air conditioning system 30. In step S18 in the second embodiment, although it is determined whether or not the air-conditioning water temperature 12 is not less than the lower limit temperature Tb, it may be determined whether or not the air-conditioning water temperature T2 is not more than the third predetermined temperature Td used in the first embodiment. By using the temperature Td, the coolant within the air conditioning circuit 31 can be prepared in a state close to the FC temperature Te, so it is possible to effectively use the heat of the coolant.

Although some embodiments of the present invention have been described in detail, the present invention is not limited to the specific embodiments but may be varied or changed within the scope of the present invention as claimed.

What is claimed is:

1. A fuel cell system comprising:
   a fuel cell stack;
   a coolant circulation passage through which a coolant for cooling the fuel cell stack circulates;
   an air conditioning system including an air conditioning circuit that is connected to the coolant circulation passage and shares the coolant circulating through the coolant circulation passage;
   an air-conditioning water pump causing the coolant to flow through the air conditioning circuit;

a heater arranged on the air conditioning circuit; and
a control unit that is programmed to perform air-conditioning-system preparation control for allowing air blowing in a heating air condition to be performed immediately when heating air blowing is requested, wherein, to perform the air-conditioning-system preparation control, the control unit is programmed to:
determine whether or not the coolant within the coolant circulation passage is capable of being supplied to the air conditioning circuit when the air conditioning system is not requested to heat air,
operate the heater to maintain a temperature of the coolant within the air conditioning circuit at a first predetermined temperature or higher when the air conditioning system is not requested to heat air and when the coolant within the coolant circulation passage is not capable of being supplied to the air conditioning circuit, and
operate the air-conditioning water pump to draw the coolant from the coolant circulation passage into the air conditioning circuit and to maintain the temperature of the coolant within the air conditioning circuit at the first predetermined temperature or higher when the coolant within the coolant circulation passage is capable of being supplied to the air conditioning circuit.

2. The fuel cell system of claim 1, wherein when an outside air temperature is equal to or lower than a predetermined temperature, the control unit is programmed to perform the air-conditioning-system preparation control.

3. The fuel cell system of claim 1, wherein when the coolant within the coolant circulation passage is not capable of being supplied to the air conditioning circuit, and when the temperature of the coolant within the air conditioning circuit reaches a second predetermined temperature set higher than the first predetermined temperature, the control unit is programmed to stop operating the heater.

4. The fuel cell system of claim 1, wherein when the coolant within the coolant circulation passage is not capable of being supplied to the air conditioning circuit, the control unit is programmed to operate the heater so as to output an output lower than an output at a time when the air conditioning system is requested to heat air.

5. The fuel cell system of claim 1, wherein when the coolant within the coolant circulation passage is capable of being supplied to the air conditioning circuit, the control unit is programmed to maintain the temperature of the coolant within the air conditioning circuit in a range from a third predetermined temperature set higher than the first predetermined temperature to the temperature of the coolant circulating through the coolant circulation passage.

6. The fuel cell system of claim 1, wherein when the coolant within the coolant circulation passage is capable of being supplied to the air conditioning circuit, the control unit is programmed to intermittently operate the air-conditioning water pump, and an operating period for each operation is set equal to or longer than a period during which the coolant within the air conditioning circuit is capable of being replaced with the coolant drawn from the coolant circulation passage.

* * * * *